(12) United States Patent
Lee et al.

(10) Patent No.: US 9,143,304 B2
(45) Date of Patent: Sep. 22, 2015

(54) UPLINK SIGNAL TRANSMISSION METHOD VIA A COMPETITION-BASED UPLINK CHANNEL

(75) Inventors: Hyun Woo Lee, Anyang-si (KR); Ji Woong Jang, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 406 days.

(21) Appl. No.: 13/639,339

(22) PCT Filed: Apr. 20, 2011

(86) PCT No.: PCT/KR2011/002822
§ 371 (c)(1),
(2), (4) Date: Oct. 4, 2012

(87) PCT Pub. No.: WO2011/132926
PCT Pub. Date: Oct. 27, 2011

(65) Prior Publication Data
US 2013/0028219 A1      Jan. 31, 2013

Related U.S. Application Data

(60) Provisional application No. 61/325,823, filed on Apr. 20, 2010.

(30) Foreign Application Priority Data

Apr. 19, 2011 (KR) .................. 10-2011-0036142

(51) Int. Cl.
*H04W 80/04* (2009.01)
*H04W 88/06* (2009.01)
(Continued)

(52) U.S. Cl.
CPC ............ *H04L 5/0094* (2013.01); *H04L 5/0053* (2013.01); *H04W 74/006* (2013.01); *H04L 5/0007* (2013.01)

(58) Field of Classification Search
CPC ..... H04W 80/04; H04W 88/06; H04W 28/04; H04W 72/04
USPC .................................................. 370/328, 329
See application file for complete search history.

(56) References Cited

U.S. PATENT DOCUMENTS

2009/0054039 A1    2/2009  Van Wijk et al.
2010/0057485 A1    3/2010  Luft
(Continued)

FOREIGN PATENT DOCUMENTS

WO      WO 2008/082908 A1      7/2008

OTHER PUBLICATIONS

"Dynamic Resource Allocation for Uplink Contention Channels in WiMAX", (Patrick Hosein), WTS 2008, Apr. 26, 2008.
(Continued)

*Primary Examiner* — Ronald B Abelson
(74) *Attorney, Agent, or Firm* — Dentons US LLP

(57) ABSTRACT

Embodiments of the present invention provide methods for providing competition uplink channels while minimizing the frequency of blind decoding operations of a terminal, and devices of supporting the methods. An uplink signal transmission method via a competition-based uplink (CB UL) channel according to one embodiment of the present invention comprises: receiving the configuration information on the CB UL channel from a base station; receiving resource information from the base station, the resource information containing at last one of the following: information on usage time of the CB UL channel, information on activation and deactivation of the CB UL channel and information on cancellation; and inspecting the validity of the resource information. If the resource information is not valid, the resource information is individually allocated to each subframe; if the resource information is valid, the resource information can be periodically and continuously allocated.

18 Claims, 10 Drawing Sheets

(51) Int. Cl.
*H04W 28/04* (2009.01)
*H04W 72/04* (2009.01)
*H04L 5/00* (2006.01)
*H04W 74/00* (2009.01)

(56) References Cited

U.S. PATENT DOCUMENTS

2010/0081451 A1 4/2010 Mueck et al.
2012/0213196 A1* 8/2012 Chung et al. .................. 370/330

OTHER PUBLICATIONS

"Downlink and Uplink Resource Allocation in IEEE 802.11 Wireless LANs", (Sung Won Kim et al.) IEEE Transactions on Vehicular Technology, vol. 54. No. 1, Jan. 31, 2005.

"On Contention Resolution Parameters for the IEEE 802.16 Base Station", (Sayenko, A. et al.), GLOBECOM '07. IEEE, Nov. 30, 2007.

* cited by examiner

UPLINK SIGNAL TRANSMISSION METHOD VIA A COMPETITION-BASED UPLINK CHANNEL

This Application is a 35 U.S.C. §371 National Stage Entry of International Application No. PCT/KR2011/002822, filed Apr. 20, 2011 and claims the benefit of U.S. Provisional Application No. 61/325,823, filed Apr. 20, 2010, and Korean Application No: 10-2011-0036142, filed Apr. 19, 2011, all of which are incorporated by reference in their entirety herein.

TECHNICAL FIELD

The present invention relates to a communication method and apparatus in a wireless access system, and more particularly, to methods and apparatuses for allocating a Contention-Based Uplink (CB UL) channel, while minimizing the number of blind decodings at a User Equipment (UE).

BACKGROUND ART

Wireless access systems have been widely deployed in order to provide various types of communication services including voice or data. In general, a wireless access system is a multiple access system that can support communication among multiple users by allowing them to share available system resources (a bandwidth, transmission power, etc.). Examples of multiple access systems include Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

The present invention considers use of CB UL channels to reduce a UL processing delay. A CB UL channel is a channel that can deliver UL data from a UE without a UE-specific Scheduling Request (SR) requesting a Base Station (BS) to initially allocate UL resources to the UE.

When a new CB UL channel is defined or an existing UL channel is used as a CB UL channel, an additional or modified Downlink (DL) control channel is required to transmit information about CB UL channel-related resource allocation. The use of the additional or modified DL control channel may increase the number of blind decodings at the UE.

That is, if the type or size of a Downlink Control Information (DCI) used for a Physical Downlink Control CHannel (PDCCH) has been changed, the number of blind decodings that the UE should perform is increased. As a result, the UE experiences increased blind decoding complexity and power consumption.

An object of the present invention devised to solve the conventional problem is to provide a method for efficiently transmitting UL data.

Another object of the present invention is to provide methods for transmitting and receiving resource allocation information about a CB UL channel, while minimizing the number of blind decodings at a UE.

Another object of the present invention is to provide a new CB UL channel or a modified UL control channel.

A further object of the present invention is to provide apparatuses for supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the foregoing technical problem, the present invention provides methods and apparatuses for allocating a CB UL channel, while minimizing the number of blind decodings at a UE.

In an aspect of the present invention, a method for transmitting an uplink signal on a Contention-Based Uplink (CB UL) channel includes receiving configuration information about the CB UL channel from a base station, receiving resource information about the CB UL channel from the base station, the resource information including information about at least one of a use time, activation, deactivation, and release of the CB UL channel, and checking the validity of the resource information. If the resource information is not valid, the resource information is allocated individually in each subframe and if the resource information is valid, the resource information is allocated periodically and persistently.

In another aspect of the present invention, a user equipment for transmitting an uplink signal on a CB UL channel includes a reception module for receiving a channel signal, a transmission module for transmitting a channel signal, and a processor for supporting transmission of the uplink signal on the CB UL channel. The user equipment receives configuration information about the CB UL channel from a base station through the reception module, receives resource information about the CB UL channel from the base station, the resource information including information about at least one of a use time, activation, deactivation, and release of the CB UL channel through the reception module, and checks the validity of the resource information through the processor. If the resource information is not valid, the resource information is allocated individually in each subframe and if the resource information is valid, the resource information is allocated periodically and persistently.

In the above aspect of the present invention, the configuration information may be received by a higher-layer signal and the resource information may be received on a Physical Downlink Control CHannel (PDCCH).

The UE may blind-decode a search space to receive the resource information and the search space may be one of a UE-specific search space, a UE group-specific search space, and a CB-specific search space.

The resource information may be included in a CB grant.

In another aspect of the present invention, a method for transmitting an uplink signal on a CB UL channel includes receiving from a base station first CB channel information about all CB UL channels available in the base station, receiving from the base station second CB channel information about a CB UL channel available to a user equipment, and transmitting the uplink signal based on the first CB channel information and the second CB channel information to the base station.

In a further aspect of the present invention, a user equipment for transmitting an uplink signal on a CB UL channel includes a reception module for receiving a channel signal, a transmission module for transmitting a channel signal, and a processor for supporting transmission of the uplink signal on the CB UL channel. The user equipment receives from a base station first CB channel information about all CB UL channels available in the base station through the reception module, receives from the base station second CB channel information about a CB UL channel available to the user equipment through the reception module, and transmits the uplink signal based on the first CB channel information and the second CB channel information to the base station through the transmission module.

The first CB channel information may be received in a system information message and the second CB channel information may be received on a PDCCH.

The CB UL channel available to the UE may be allocated periodically and persistently.

The user equipment may check the validity of the second CB channel information through the processor. If the second CB channel information is not valid, the resource information may be allocated individually in each subframe and if the second CB channel information is valid, the resource information may be allocated periodically and persistently.

The user equipment may blind-decode a search space to receive the second CB channel information through the processor, and the search space may be one of a UE-specific search space, a UE group-specific search space, and a CB-specific search space.

The above aspects of the present invention are merely a part of preferred embodiments of the present invention. Thus it will be apparent to those skilled in the art that various embodiments of the present invention reflecting the technical features of the present invention can be derived and understood from the following detailed description of the present invention.

Advantageous Effects

According to the embodiments of the present invention, the following effects can be achieved.

First of all, a UE can transmit UL data efficiently.

Secondly, a UE can receive resource allocation information about a CB UL channel, while minimizing the number of blind decodings.

Thirdly, a UE and a BS can transmit and receive resource allocation information about a CB UL channel, reducing the number of blind decodings of the UE by using a new CB UL channel or a modified CB UL channel.

Fourthly, a BS can reduce the overhead of DL signaling used to allocate a CB UL channel by transmitting scheduling information about the CB UL channel on double channels.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR CARRYING OUT THE INVENTION

Figure 1:
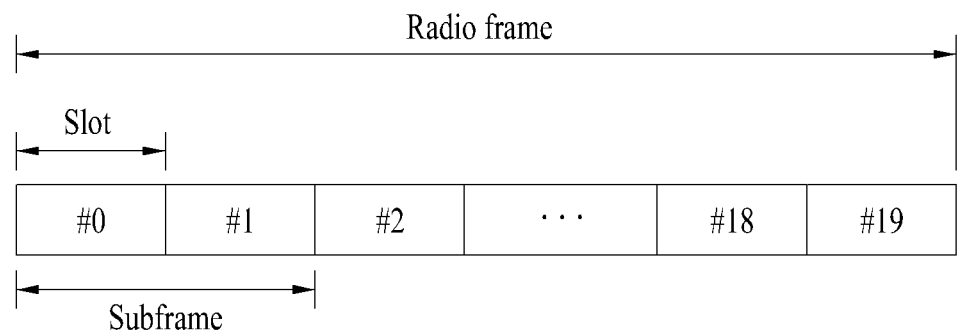
FIG. 1 illustrates the structure of a radio frame that can be used in embodiments of the present invention.

Embodiments of the present invention provide various methods for transmitting and receiving a Contention-Based Uplink (CB UL) channel and apparatuses for supporting the same.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is made, centering on a data transmission and reception relationship between a Base Station (BS) and a User Equipment (UE). A BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', Advanced BS (ABS)', 'Access Point (AP)', etc.

In addition, the term 'terminal' may be replaced with the term 'UE', 'Mobile Station (MS)', 'Subscriber Station (SS)', 'Mobile Subscriber Station (MSS)', 'Mobile Terminal', 'Advanced MS (AMS)', etc.

A transmission end refers to a fixed and/or mobile node that provides data service or voice service and a reception end refers to a fixed and/or mobile node that receives data service or voice service. Accordingly, a UE may serve as a transmission end and a BS may serve as a reception end, on the uplink, whereas the UE may serve as a reception end and the BS may serve as a transmission end, on the downlink.

The embodiments of the present invention can be supported by standard documents disclosed for at least one of wireless access systems, that is, an Institute of Electrical and Electronics Engineers (IEEE) 802.xx system, a 3rd Generation Partnership Project (3GPP) system, a 3GPP Long Term Evolution (LTE) system, and a 3GPP2 system. Especially, the embodiments of the present invention can be supported by 3GPP TS 36.211, 3GPP TS 36.212, 3GPP TS 36.213, and 3GPP TS 36.321. That is, steps or parts that are not described in order to clarify the subject matter of the present invention can be supported by the above documents. Further, all terms described in this specification can be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are used to help the understanding of the present invention and they can be replaced with other terms within the spirit and scope of the present invention.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc.

UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. For clarity, the present invention will be described in the context of the 3GPP LTE/LTE-A system. However, the technical features of the present invention are not limited thereto. For example, the technical features of the present invention are applicable to an IEEE 802.16e/m system.

1. Basic Structure of 3GPP LTE/LTE_A System

FIG. 1 illustrates a radio frame structure that can be used in embodiments of the present invention.

A radio frame is divided into 10 subframes. Each subframe is further divided into two slots. A unit time during which one subframe is transmitted is defined as a Transmission Time Interval (TTI). For example, one subframe may be 1 ms in duration and one slot may be 0.5 ms in duration.

A slot may include a plurality of Orthogonal Frequency Division Multiplexing (OFDM) symbols in the time domain and a plurality of Resource Blocks (RBs) in the frequency domain. In a 3GPP LTE system that adopts OFDMA for downlink, an OFDM symbol represents one symbol period. That is, an OFDM symbol may be referred to as an SC-FDMA symbol or symbol period on the uplink. An RB is a resource allocation unit including a plurality of contiguous subcarriers in a slot.

The radio frame structure illustrated in FIG. 1 is purely exemplary and thus the number of subframes in a radio frame, the number of slots in a subframe, and the number of OFDM symbols in a slot may vary.

Figure 2:
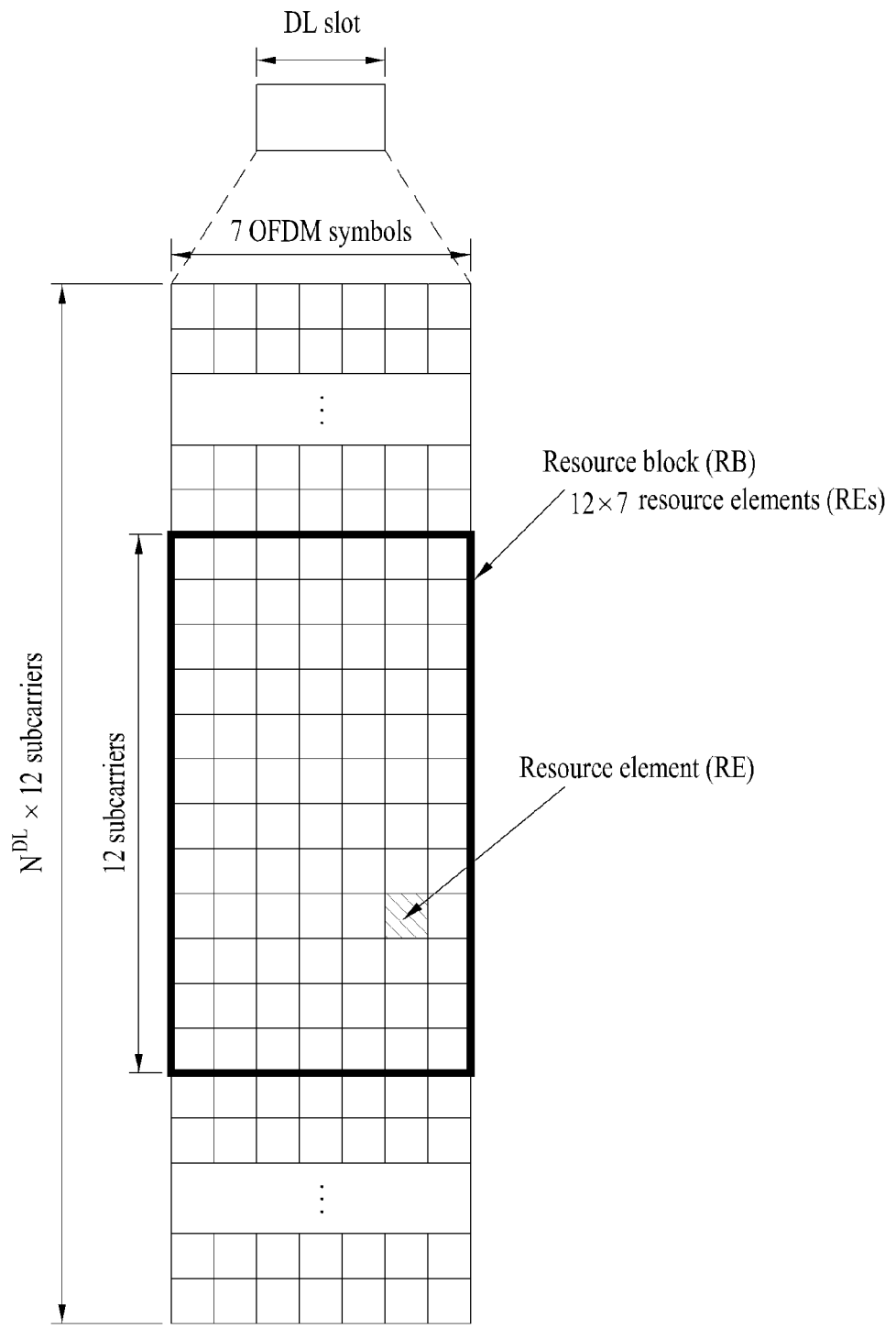
FIG. 2 illustrates the structure of a resource grid for the duration of one Downlink (DL) slot, which can be used in embodiments of the present invention.

FIG. 2 illustrates the structure of a resource grid for the duration of one Downlink (DL) slot, which can be used in embodiments of the present invention.

A DL slot includes a plurality of OFDM symbols in the time domain. In FIG. 2, a DL slot includes 7 OFDM symbols and an RB includes 12 subcarriers in the frequency domain, by way of example.

Each element of the resource grid is referred to as a Resource Element (RE). An RB includes 12×7 REs. The number of RBs in a DL slot, $N^{DL}$ depends on a DL transmission bandwidth set by a cell.

Figure 3:
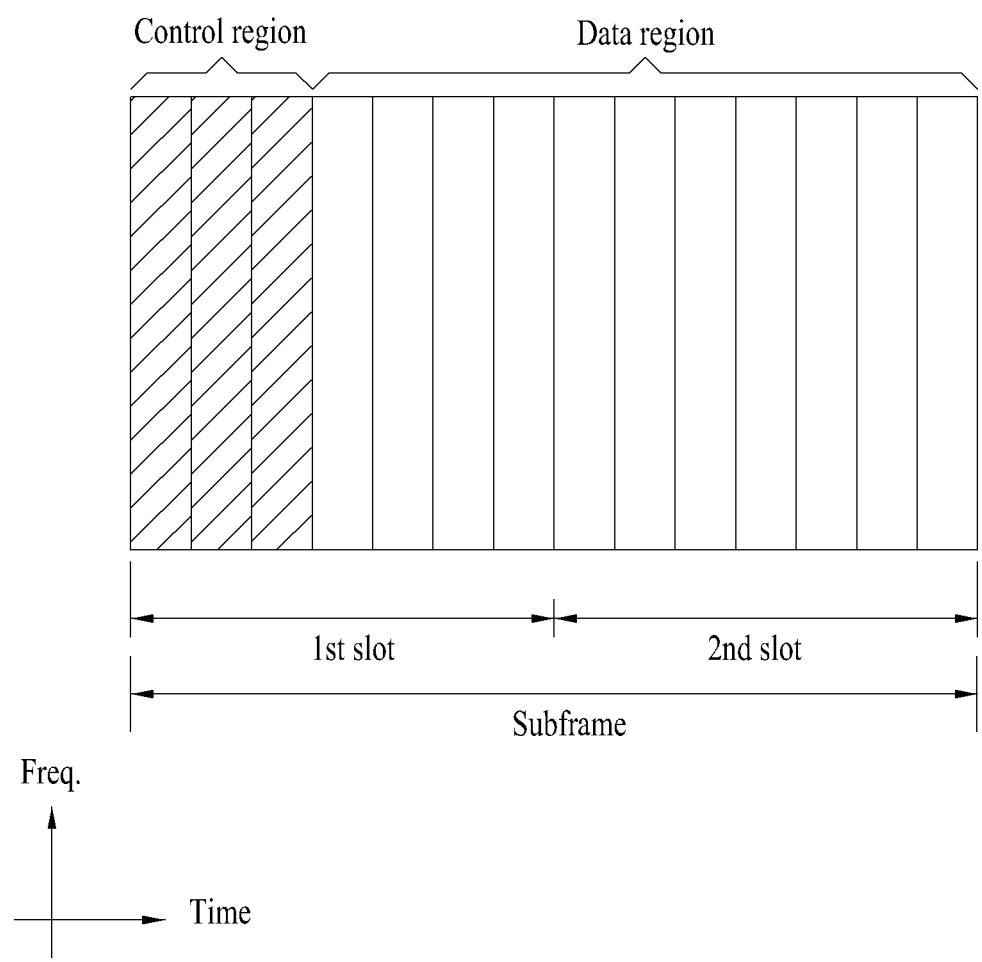
FIG. 3 illustrates the structure of a DL subframe, which can be used in embodiments of the present invention.

FIG. 3 illustrates the structure of a DL subframe that can be used in embodiments of the present invention.

A subframe includes two slots in the time domain. Up to three OFDM symbols at the start of the first slot in a DL subframe are used for a control region to which control channels are allocated and the other OFDM symbols of the DL subframe are used for a data region to which a Physical Downlink Shared CHannel (PDSCH) is allocated.

DL control channels used in the 3GPP LTE system include a Physical Control Format Indicator CHannel (PCFICH), a Physical Downlink Control CHannel (PDCCH), and a Physical Hybrid-ARQ Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. That is, an ACK/NACK signal for Uplink (UL) data transmitted from a UE is delivered on the PHICH.

Control information carried on the PDCCH is called Downlink Control Information (DCI). The DCI includes resource allocation information and other control information for a UE or a UE group. For example, the DCI may transport UL resource allocation information, DL resource allocation information, and UL Transmit Power Control (TPC) commands.

The PDCCH may carry information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of TPC commands for individual UEs of a UE group, TPC commands, Voice Over Internet Protocol (VoIP) activation information, etc.

A plurality of PDCCHs may be transmitted in the control region. A UE may monitor a plurality of PDCCHs. A PDCCH may be transmitted in one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information.

The CRC is masked by an Identifier (ID) known as a Radio Network Temporary Identifier (RNTI) according to the owner or usage of the PDCCH. If the PDCCH is directed to a specific UE, its CRC may be masked by a UE-specific ID (e.g. a Cell-RNTI (C-RNTI)). If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

A PDCCH may be transmitted in one or more Component Carriers (CCs) in a carrier aggregation environment and may include resource allocation information about one or more CCs. For instance, although the PDCCH is transmitted in one CC, it may include resource allocation information about one or more PDSCHs and PUSCHs.

Figure 4:
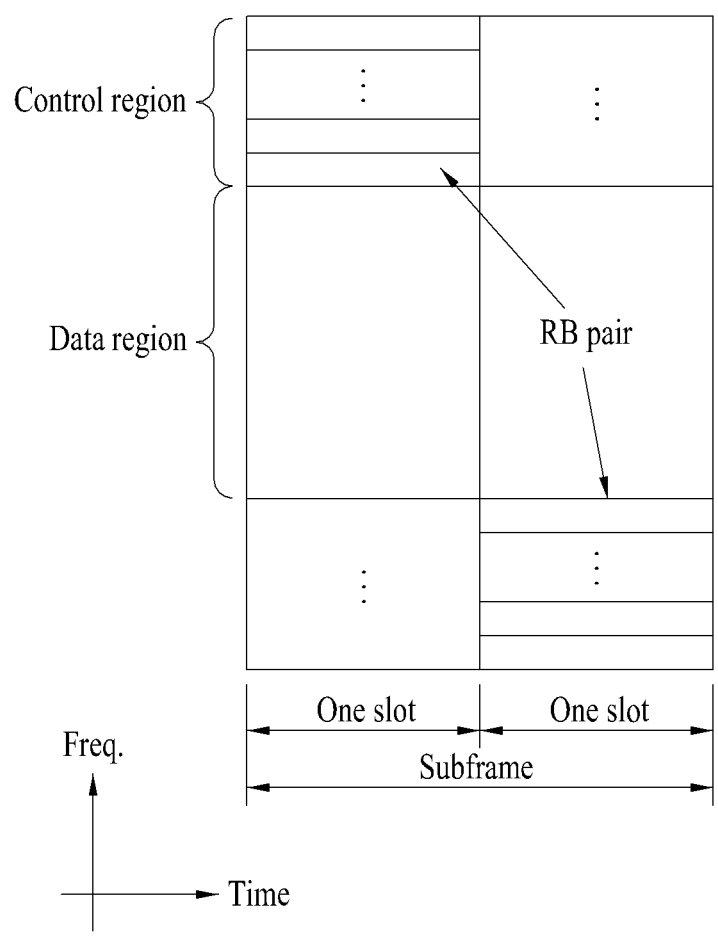
FIG. 4 illustrates the structure of an Uplink (UL) subframe, which can be used in embodiments of the present invention.

FIG. 4 illustrates the structure of a UL subframe whish can be used in embodiments of the present invention.

Referring to FIG. 4, a UL subframe includes a plurality of (e.g. 2) slots. Each slot may include a different number of SC-FDMA symbols according to a Cyclic Prefix (CP) length. The UL subframe is divided into a data region and a control region in the frequency domain. The data region includes a Physical Uplink Shared CHannel (PUSCH) and is used to transmit a data signal including voice information. The control region includes a Physical Uplink Control CHannel (PUCCH) and is used to transmit Uplink Control Information (UCI). The PUCCH is allocated to an RB pair at both ends of the data region along the frequency axis and hops between slots. To maintain a single carrier property in the LTE system, a UE does not transmit a PUSCH and a PUCCH simultaneously. On the other hand, a PUCCH signal and a PUSCH signal can be transmitted simultaneously in the same subframe according to the transmission mode of a UE and a PUSCH signal may be piggybacked with PUCCH signal in the LTE-A system.

A PUCCH for a UE is allocated to an RB pair in a subframe. The RBs of the RB pair occupy different subcarriers in two slots. Thus it is said that the RB pair allocated to the PUCCH is frequency-hopped over a slot boundary.

The PUCCH may deliver the following control information.

Scheduling Request (SR): information used to request UL-SCH resources. The SR is transmitted by On-Off Keying (OOK).

HARQ ACK/NACK: A response signal for a PDCCH indicating a DL data packet on a PDSCH or Semi-Persistent Scheduling (SPS) release. The HARQ ACK/NACK signal indicates whether a DL data packet has been received successfully. A 1-bit ACK/NACK is transmitted in response to a single DL codeword and a 2-bit ACK/NACK is transmitted in response to two DL codewords.

Channel Quality Indicator (CQI) or Channel State Information (CSI): feedback information for a DL channel. Multiple Input Multiple Output (MIMO)-related feedback information includes a Rank Indicator (RI) and a Precoding Matrix Indicator (PMI). 20 bits are used per subframe.

The amount of UCI that a UE can transmit in a subframe is dependent on the number of available SC FDMA symbols for control information transmission. The remaining SC-FDMA symbols except SC-FDMA symbols allocated to Reference Signals (RSs) are available for transmission of control information. In a subframe having a Sounding Reference Signal (SRS), the last SC-FDMA symbol of the subframe is also excluded from control information transmission. An RS is used for coherent detection of a PUCCH. The PUCCH supports 7 formats according to its transmission information.

[Table 1] illustrates PUCCH format-UCI mapping relationships in the LTE system.

TABLE 1

| PUCCH format | UCI |
|---|---|
| Format 1 | SR |
| Format 1a | 1-bit HARQ ACK/NACK with or without SR |
| Format 1b | 2-bit HARQ ACK/NACK with or without SR |
| Format 2 | CQI (20 coded bits) |
| Format 2 | CQI and 1-bit or 2-bit HARQ ACK/NACK for extended CP case |
| Format 2a | CQI and 1-bit HARQ ACK/NACK |
| Format 2b | CQI and 2-bit HARQ ACK/NACK |

Referring to [Table 1], UCI can be determined according to PUCCH formats.

Various radio access technologies of the 3GPP system are applicable to the embodiments of the present invention. For example, various DL control channels, DL-SCHs, UL-SCHs, and UL control channels can be used in the embodiments of the present invention. For a description of DCI formats used for DL control channels, refer to section 7.1 to section 8 of 3GPP TS 36.213 v90.0.

To receive a PDSCH signal, a UE should perform Blind Decoding (BD) on a PDCCH signal. Therefore, the UE may perform blind decoding on a DCI format according to the type and/or transmission mode of an RNTI (e.g. a C-RNTI or an SI-RNTI) used for CRC scrambling. For its description, refer to section 7.1 of 3GPP TS 36.213 v90.0.

To transmit a PUSCH signal to an eNB, a UE should perform blind decoding on a PDCCH signal including related information. The UE may perform blind decoding on a DCI format according to the type of a specific RNTI (e.g. a C-RNTI or an SI-RNTI) to be used for CRC scrambling. For its description, refer to section 8 of 3GPP TS 36.213 V90.0.

In addition, for a description of a PDCCH used in the embodiments of the present invention, refer to section 6.8 or below in 3GPP TS 36.213 V90.0. For a PDCCH allocation procedure, refer to section 9.1.1 in 3GPP TS 36.213 V90.0.

A corresponding part of the document tells that search spaces in which a UE monitors PDCCH candidates (i.e. blind decoding) are divided into a common search space and a UE-specific search space.

The UE should perform blind decoding on 4 PDCCHs and 2 PDCCHs for aggregation levels 4 and 8, respectively in the common search space. The UE should also perform blind decoding for up to 2 payload sizes (e.g. DCI format 0/1A/3/3A and DCI format 1C) according to available DCI formats in each candidate. Accordingly, each UE should perform up to 12 (6×2) blind decodings in the common search space.

In the UE-specific search space, each UE should perform blind decoding on 6, 6, 2, and 2 PDCCH candidates for four aggregation levels 1, 2, 4, and 8, respectively. Up to payload sizes may be defined according to available DCI formats in each PDCCH candidate. That is, the UE should perform blind decoding for each of the two payload sizes with respect to the total number of (16) PDCCHs. Therefore, each UE may perform up to 32 blind decodings in the UE-specific search space.

As described above, the UE should perform up to 44 blind decodings in the common search space and the UE-specific search space.

To reduce a UL processing delay, embodiments of the present invention provide a CB UL channel and methods for transmitting UL data on the CB UL channel. A CB UL channel is a channel on which a UE can transmit UL data without transmitting to an eNB a dedicated SR requesting first UL resource allocation. That is, the UE does not need to transmit an SR to the eNB and the eNB may not allocate UL resources for SR transmission to each UE.

Accordingly, a new CB UL channel may be provided in the embodiments of the present invention. Additionally, an existing PUSCH or PUCCH may be used as a CB UL channel.

In this case, a DL control channel is required to transmit information such as CB UL channel-related resource allocation information. The use of such an additional or modified DL control channel may increase the number of blind decodings at the UE. That is, since a change in the type or size of a DCI format used for a PDCCH increases the number of blind decodings that the UE should perform, blind decoding complexity and power consumption at the UE are also increased. Preferably, the additional or modified DL control channel is used in a manner that minimizes the number of blind decodings at the UE.

The embodiments of the present invention provide methods for transmitting resource allocation information about a CB UL channel by an eNB, while minimizing the number of blind decodings at a UE.

2. Shared Dedicated-Scheduling Request (D-SR)

The following two options may be considered to activate a shared D-SR.

Option 1: A UL grant may be addressed to a new SR-RNTI. That is, a new SR-RNTI may be configured for each group of sharing UEs.

Option 2: PUCCH format 1a or PUCCH format 1b may be used for an SR. For instance, if PUCCH format 1a is used, two UEs may be identified. If PUCCH format 1b is used, four UEs may be identified. After receiving an SR in PUCCH format 1a or PUCCH format 1b, the eNB may transmit a general UL grant to identified UEs.

A shared PUCCH SR transmission operation in Option 1 will be described below.

If two or more UEs share the same SR resources, the eNB cannot determine whether one or more UEs use one SR. In this case, the eNB may allocate (1) a shared UL grant to UEs or (2) a dedicated UL grant to each UE whenever the eNB receives a shared SR.

Figure 5:
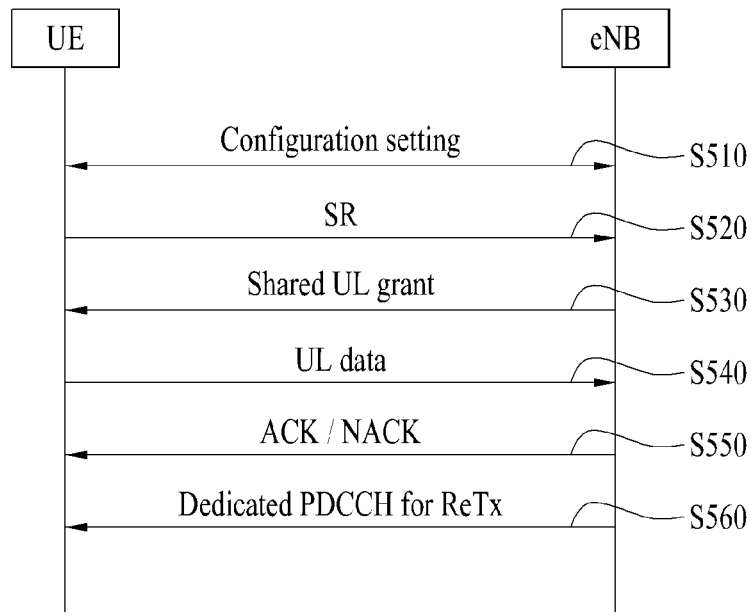
FIG. 5 illustrates an exemplary case in which an evolved Node B (eNB) allocates a shared UL grant to a User Equipment (UE)

FIG. 5 illustrates an exemplary case in which an eNB allocates a shared UL grant to a UE.

If the eNB determines that HARQ transmission will be failed after allocating a shared UL grant to the UE, the eNB may allocate dedicated grants to all UEs sharing an SR.

Referring to FIG. 5, the eNB may configure connections with one or more UEs by transmitting to the UEs radio resource information needed for transmitting a shared SR (e.g. offset information and period information). Shared SR resources are PUCCH resources used for a UE's SR. The shared SR resources may be allocated to two or more UEs. The resources may be identified by a physical time/frequency region and a sequence (or a code) (S510).

A UE may transmit a shared SR signal to the eNB based on the radio resource information received in step S510 in order to request UL resource allocation (S520).

Upon receipt of the SR, the eNB may allocate shared UL resources to the UE and may transmit a PDCCH signal including a shared UL grant to the UE to indicate the shared UL resource allocation (S530).

The UE transmits UL data in the allocated shared UL resources (i.e. a PUSCH) to the eNB (S540).

If two or more UEs transmit UL data simultaneously in the shared UL resources, collision may occur between the UL data. In addition, an error may occur to the UL data transmitted by the UE or the UL data may not be transmitted in the UL resources that the eNB has allocated to the UE. In this case, the eNB transmits a NACK signal to the UE (S550).

To allocate new UL resources, the eNB may allocate dedicated UL resources to each UE. For example, the eNB may allocate a dedicated UL grant to each of UEs sharing an SR. Or the eNB may allocate dedicated UL grants to a part of the UEs sharing an SR, while making the other UEs perform a non-adaptive HARQ retransmission in shared PUSCH resources (S560).

Collision between UL data can be prevented and a retransmission delay can also be controlled, by allocating dedicated UL grants to UEs that have failed in UL transmission, as illustrated in FIG. 5.

Compared to the method illustrated in FIG. 5, whenever the eNB receives a shared SR, the eNB may allocate a dedicated grant to each UE. Even though a plurality of UEs share an SR by dedicated signaling, the eNB may allocate a dedicated UL grant to each UE.

Therefore, UL data collision between UEs may be prevented during PUSCH transmission and an LTE Rel-8 retransmission method can still be used. Since every UE receiving a UL grant does not have transmission data, a PUSCH signal may be partially lost. If the eNB allocates a dedicated UL grant to each UE each time the eNB receives an SR, less PUSCH resources may be consumed than CB-PUSCH resources.

Figure 6:
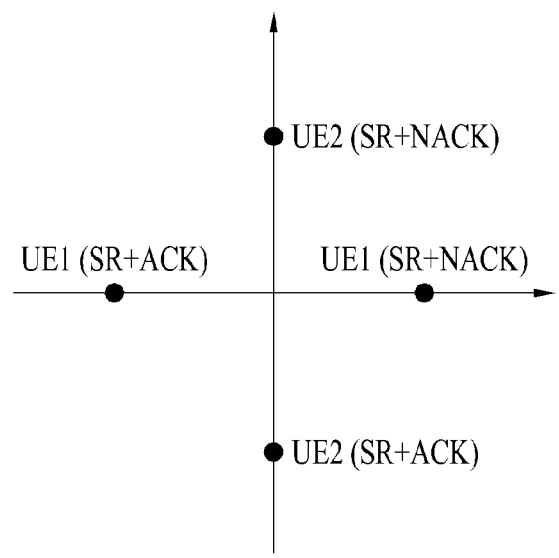
FIG. 6 illustrates one of methods for using Physical Downlink Control CHannel (PDCCH) format 1a and PDCCH format 1b for a shared Physical Uplink Control CHannel-Scheduling Request (PUCCH-SR)

FIG. 6 illustrates one of methods for using PDCCH format 1a and PDCCH format 1b for a shared PUCCH-SR.

Now a description will be given of a method for using PUCCH format 1a or PUCCH format 1b for a shared PUCCH SR in Option 2. Referring to FIG. 6, each UE may share the same SR without collision by using PUCCH format 1a or PUCCH format 1b. That is, even though two UEs transmit SRs in the same TTI, the eNB can detect the SRs successfully and identify the UEs.

A case where a contention-based PUSCH signal transmission method and a D-SR method are used together will be described.

A CB UL channel is allocated when an eNB cannot predict when each UE needs an SR or a Bandwidth Request (BR). Meanwhile, a UE may need to fast communicate with the eNB in the event of emergency or during fast movement. In this case, it will be inefficient for the UE to configure a connection with the eNB by a plurality of signalings. In this context, when the UE needs fast communication with the eNB, a CB UL channel is used.

On the assumption that contention-based resource allocation is possible in every TTI, differences of 3 ms and 1 ms may exist between a CB transmission period and an SR period because a UE does not need to await reception of a response to a D-SR transmitted to the eNB. Although the same effect can be achieved by already allocated dedicated UL resources, allocation of dedicated resources to every UE in every TTI is not cost-effective.

Figure 7:
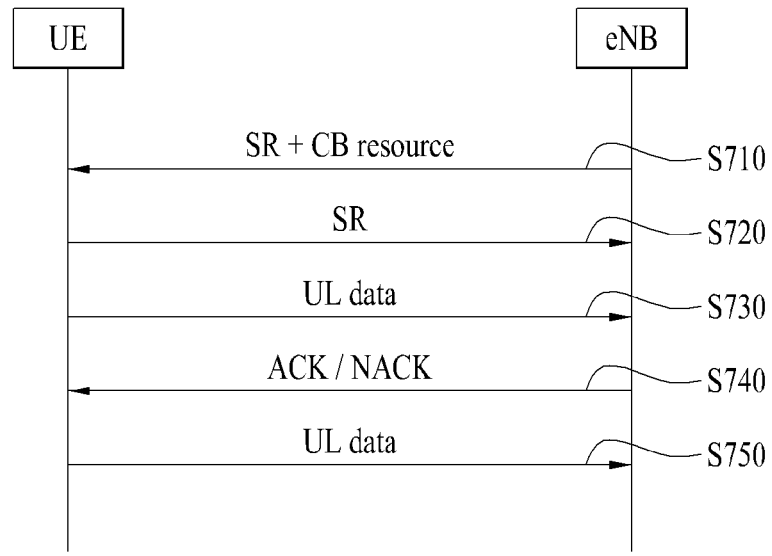
FIG. 7 illustrates an exemplary SR procedure related to contention-based UL data transmission.

FIG. 7 illustrates an exemplary SR procedure related to contention-based UL data transmission.

Referring to FIG. 7, the eNB may transmit resource information needed for a D-SR (SR resource information) and resource information needed for a CB UL channel (i.e. CB resource information) to one or more UEs (S710).

In step S710, the SR resource information refers to information about PUCCH resources used for a UE to transmit an SR to the eNB, and the CB resource information refers to information about PUSCH resources used for contention-based UL data transmission. The SR resource information and the CB resource information may be allocated to two or more UEs. The SR resource information and the CB resource information may be distinguished by physical time/frequency regions and sequences (or codes).

The SR resource information and the CB resource information may be indicated by higher-layer signaling such as Radio Resource Control (RRC) signaling in step S710. However, if UL resources need to be allocated dynamically, the UL resources may be indicated by a PDCCH signal including a Contention Based-RNTI (CB-RNTI).

If one or more UEs have UL transmission data, each of the UEs may transmit an SR to the eNB, for allocation of UL resources for UL data transmission (S720).

The UE may also transmit UL data (i.e. a Transport Block (TB)) along with the SR without waiting for a UL grant in response to the SR (S730).

The eNB may identify the UE using CB resources based on the received SR. Upon receipt of one or more SRs in the same UL resources, the eNB may determine that collision has occurred between UEs. Therefore, the eNB may transmit NACK signals and dedicated UL grants to the UEs regardless of whether UL data has been received successfully. Upon receipt of only one SR in the same UL resources, the eNB may determine that no collision has occurred between UEs. Therefore, the eNB may transmit to the UE an ACK signal for successful transmission of UL data in the corresponding UL resources or a NACK signal for failed transmission of UL data in the corresponding UL resources (S740).

Upon receipt of the NACK signal from the eNB, the UE may retransmit the UL data. Upon receipt of the ACK signal from the eNB, the UE may transmit new UL data (S750).

Since the UE is identified by the SR, the UE may retransmit UL data adaptively in different UL resources to the eNB in step S750. Thus, the UE can reduce the overhead of CB resources.

3. Method for Transmitting CB UL Channel Signal

In a method for transmitting a UL signal on a CB UL channel, UEs that have acquired UL synchronization can transmit UL channel signals to an eNB without a general procedure for being allocated UL resources for initial UL data transmission.

That is, the CB UL channel signal transmission method allows a UE to transmit a UL channel signal without a procedure for transmitting an SR to the eNB and being allocated UL resources from the eNB in response to the SR. This CB UL channel signal transmission method can reduce a transmission delay and signaling overhead.

Hereinbelow, the method for transmitting a UL signal on a CB UL channel will be referred to as "CB transmission" or "UL transmission" shortly. A channel signal covers both a UL data signal and a UL control signal. A CB UL channel also covers both a CB-PUCCH and a CB-PUSCH. The CB-PUCCH and the CB-PUSCH are a conventional PUSCH and PUCCH allocated as CB channels. Needless to say, the CB-PUCCH and the CB-PUSCH may have different formats from the conventional PUSCH and PUCCH.

Typically, CB transmission is characterized by an increased error rate for multiple users using the same shared UL grant. Therefore, it is critical that an eNB has means and a method for fast and efficient resource allocation between CB transmission and Contention Free (CT) transmission.

Although UL resources for CB transmission may be configured and allocated by higher-layer signaling such as RRC signaling, a PDCCH is used to allocate UL RBs for CB transmission fast and dynamically. A CB grant transmitted on the PDCCH may be used to allocate UL resources for CB transmission. The CB grant transmitted on the PDCCH may be identified by the PDCCH signal and a CB-RNTI. The CB grant may be scheduled for every subframe, along with other grants. In this manner, UL CF transmission scheduling may not be affected by CB transmission and static or semi-static allocation of CB resources may be avoided even during dynamic allocation of CB resources according to UL load.

For UL transmission from a UE, a CB grant may indicate transmission resources of a PUSCH. Accordingly, CB UL data may be transmitted on the PUSCH. The UE may transmit the CB UL data in UL resources (i.e. CB UL channel resources) indicated by the CB grant, only when the UE does not have a dedicated CF grant at a specific time.

If shared resources are used, a C-RNTI MAC control element may be added to a MAC PDU to identify a UE and a Buffer Status Report (BSR) may be used to help a UL scheduler of the eNB. The UE may transmit an SR requesting CF resources to the eNB, simultaneously with CB transmission.

That is, UL data is transmitted on the PUSCH, the C-RNTI MAC control element is added to identify the UE, and the BSR is also transmitted at an initial UL transmission of the UE in order to help the UL scheduler.

4. Methods for Resource Allocation for CB UL Channel, Taking into Account the Number of Blind Decodings Methods for transmitting resource allocation information about a CB UL channel by an eNB, while minimizing the number of blind decodings at a UE will be described. For convenience' sake, the embodiments of the present invention are described in the context of a CB UL channel discussed in the LTE-A system (e.g. a PUSCH or PUCCH). The same description is also applicable to other CB channels.

For convenience' sake of description, it is assumed that a new RNTI is assigned to a CB UL channel, for identification. For instance, the new RNTI is called a CB-RNTI.

(1) Method Using Common Search Space

DL scheduling information (e.g. DCI or a CB grant) for a CB UL channel may be transmitted to a UE or UEs in a common search space. To distinguish the DL scheduling information for the CB UL channel from conventional DL scheduling information and minimize the number of blind decodings at a UE, the following method should be adopted.

First of all, the DL scheduling information for the CB UL channel is preferably scrambled in a different manner from CRC scrambling schemed already defined for a common search space.

The DL scheduling information for the CB UL channel is preferably configured into payload having the same size as one of DCI formats already defined for the common search space. The payload size includes the length of zero padding bits. That is, compared to conventional methods, it is preferred not to increase the number (e.g. 2) of blind decodings by different payload sizes.

Since a CB UL channel is directed to any UE, each UE should be able to easily detect the CB UL channel in the embodiments of the present invention. Accordingly, the scheduling information for the CB UL channel may have one of the following characteristics.

Scheduling information for a CB UL channel may be allocation information about a UL CC linked to a DL CC or information about a UL CC allocated by the DL CC.

2) Only a system-specific or UE-specific channel such as a UL primary channel may be defined as a CB UL channel. That is, scheduling information (e.g. a UL grant) is preferably transmitted on a carrier such as a UL primary CC that a UE can receive.

3) Allocation information about a CB UL channel may include a carrier indicator. That is, the UE may acquire DL scheduling information by decoding a specific common search space indicated by the carrier indicator without blind decoding of any entire common search space. Accordingly, the eNB may transmit a carrier indicator indicating a UL CC, when transmitting grant information in a common search space of a DL CC.

4) A CB-RNTI that a UE will detect may be allocated on a UE basis or on a UE group basis, or may be set freely by an eNB irrespective of UEs. For example, the eNB may indicate one or more specific CB-RNTIs to a specific UE by dedicated signaling.

Or the eNB may broadcast available CB-RNTIs in system information to one or more UEs and a UE may select its ID from the available CB-RNTIs. Herein, the UE may select any CB-RNTI or may select a CB-RNTI according to the ID or type of the UE, the access class of the UE, or a CC used for the UE in an eNB-set rule.

A plurality of CB-RNTIs may exist according to their characteristics. For example, CB-RNTIs may be classified according to PDCCH payload sizes, retransmission availability, or error rates ensured by the CB-RNTIs.

5) Scheduling information identified by a CB-RNTI may have a variable size because the CB-RNTI may have a different information amount according to an allocation scheme or a configuration. However, it is preferred that DCI used for scheduling information for a CB UL channel in a common search space has one payload size. In addition, it is important not to increase the number of blind decodings by making the payload size of the corresponding DCI equal to a conventional DCI payload size for DCI transmitted in the common search space.

In the legacy 3GPP LTE system, only two DCI sizes are available to a common search space. Therefore, two DCI sizes are basically available to a CB-RNTI. If more DCI payload sizes are supported, padding bits may be inserted to match DCI corresponding to CB-RNTIs to one size. For example, DCI may be configured to one blind decoding size by adding padding bits to a DCI format or DCI may be designed to be converged to a conventional size for the common search space.

6) DCI corresponding to a CB-RNTI may carry the following information.

Contiguous UL resource allocation information

Non-contiguous UL resource allocation information

Resource information for random access: it includes at least one of an index range or set of DM-RSs, information about the configuration of an interleaver and a scrambler, and spreading sequence information (e.g. access such as CDMA).

Time information for resource allocation: information carried in the DCI may be UL allocation information in a specific subframe, UL allocation information in a subframe, or allocation information about a plurality of subframes having a predetermined pattern. Time information for resource allocation may be information about resource allocation of contiguous subframes or non-contiguous subframes.

Information about the starting point of a valid CB UL channel (i.e. an interval or accurate position information about the corresponding time point).

MIMO transmission mode information (e.g. single transmission, multi-transmission, spatial multiplexing mode, or diversity mode).

Power configuration information: information about a power control configuration applicable on a UE basis or information about a power level that each UE will use to access a CB UL channel in the radio environment of the UE.

Modulation Coding Scheme (MCS) information: information about an MCS to be used for each UE. MCS information may indicate one MCS or a specific MCS set/range.

(2) Method Using UE-Specific Search Space

DL scheduling information for a CB UL channel may be transmitted to a UE or UEs in a UE-specific search space. Information about the CB UL channel may be indicated by UE-specific signaling. In this case, an eNB may control a UE's access to the CB UL channel.

For instance, the eNB may explicitly manage and allocate CB UL channel resources for each UE, rather than it allocates CB UL channel resources to any UE. That is, although a CB UL channel is contention-based from the viewpoint of the eNB, it may not be perceived as contention-based to the UE.

If the eNB is to request a UE to change an operation, the eNB may transmit DCI including a CB-RNTI or an indication regarding a CB UL channel to each UE. If the eNB does not request an operation change in a UE, the eNB may transmit DCI used in the legacy system to the UE.

However, since the eNB has no knowledge of whether a specific UE will use corresponding resources actually, the eNB preferably allocates the resources to a plurality of UEs in a contention-based manner. Therefore, to distinguish the cases, the eNB preferably transmits resource information about a CB UL channel in DCI transmitted in a UE-specific search space.

If a UE can identify a CB UL channel, the UE may perform at least one of the following operations.

The UE may check an ACK/NACK response to transmitted data on the PHICH, as is done in the legacy LTE system.

The UE may receive an ACK/NACK response to transmitted data in group response information transmitted by the eNB (e.g. including all of ACK/NACK information detected on a new PDCCH or directly transmitted on a PDSCH).

The UE does not check ACK/NACK information for transmitted data.

The UE retransmits UL data only when an ACK/NACK is confirmed. Herein, resources used by the UE may be the same CB UL channel. If the eNB allocates a new CB UL channel as a dedicated channel to the UE, the UE may retransmit UL data on the new CB UL channel.

Allocation information about a CB UL channel (i.e. DL scheduling information for the CB UL channel) may include all or a part of information carried in the afore-mentioned CB-RNTI DCI.

If a UE-specific search space is used, the following methods may be considered to distinguish DL information about a CB UL channel from conventional DL information and minimize the number of blind decodings at a UE.

1) The CRC of DL scheduling information for a CB UL channel may be scrambled with a C-RNTI in the UE-specific search space in the same manner as in the legacy LTE system. However, the CRC of the DL scheduling information for the CB UL channel may be scrambled with a CB-RNTI different from the conventional RNTIs in the present invention.

2) Preferably, DL scheduling information for a CB UL channel (e.g. DCI or a CB grant) has the same payload size as one of DCI formats already defined for the UE-specific search space. That is, a DCI payload size used in the embodiments of the present invention is preferably equal to a DCI payload size used in the legacy LTE system. This is because if new DCI having a different payload size from those defined in the LTE system is defined, the number of blind decodings at a UE may be increased.

(3) Additional CB-Specific Search Space

DL scheduling information for a CB UL channel may be transmitted to a UE or UEs in a new search space other than a common search space or a UE-specific search space. The additional search space may be allocated UE-specifically or UE group-specifically. Notably, the additional search space may be overlapped with the common search space or the UE-specific search space.

1) A CRC Scrambling Scheme Used for DL Scheduling information for a CB UL channel should be distinguished from a CRC scrambling scheme already defined for the additional search space (in the case where the additional search space may be overlapped with a common search space and a UE-specific search space). For this purpose, a UE-specific or UE group-specific RNTI distinguished from conventional RNTIs may be used for the CRC scrambling. For instance, the CRC of the DL scheduling information for the CB UL channel may be scrambled with a CB-RNTI.

2) The DL scheduling information for the CB UL channel preferably has the same payload size as that of one of DCI formats already defined for the additional CB-specific search space.

The CB-specific search space is configured UE group-specifically or cell-/carrier-specifically. Therefore, it is preferred that the CB-specific search space occupies a predetermined radio resource space, like the conventional common search space. In addition, it is preferred that a PDCCH aggregation level for the CB-specific search space provides an SNR and/or coverage that enables as many UEs as possible to decode. Thus, the CB-specific search space may have the following characteristics.

The CB-specific search space may reside at a specific fixed position of a PDCCH or PDSCH.

A decoding unit of the CB-specific search space may have an aggregation level of 1, 2, 4, 8, or higher in CCEs. Considering fairness with the common search space, it is preferred that the decoding unit of the CB-specific search space has an aggregation level of 4 or 8.

The CB-specific search space may be located immediately following the common search space. Or the CB-specific search space may be fixed at the last CCE group position in a CCE region of a PDCCH.

If the CB-specific search space is allocated to a PDSCH, the eNB may transmit information explicitly indicating allocation of the CB UL channel to a specific PDSCH area to the UE or may directly signal other control channels (e.g. a control channel for a relay or an extended PDCCH). Or if other control channels exit, the UE may implicitly detect information about the CB UL channel in a control channel existing in the PDSCH area. Or to transmit the CB UL channel information to the UE, the eNB may transmit information about specific UL resources directly to the UE (P-t-P) or in a broadcast message to the UE. Or information about the CB UL channel resources may be preserved as preset information in the UE and the eNB.

If various CB-RNTIs have been defined, CB-specific search spaces may be configured separately according to the CB-RNTIs. Nonetheless, a plurality of UEs may share a control channel carrying scheduling information about a CB-RNTI.

5. Persistent CB UL Channel Allocation Method

In the embodiments of the present invention, a CB UL channel may be allocated in a predetermined pattern. A CB UL channel is used because the eNB cannot predict when each UE needs an SR or BR. However, allocation of CB UL channel resources and transmission and reception of CB UL resource allocation information in every subframe may cause unnecessary DL control overhead. Therefore, the overhead of a network can be reduced by allocating CB UL channels in every predetermined period longer than a subframe (for example, a frame or a superframe).

Figure 8:
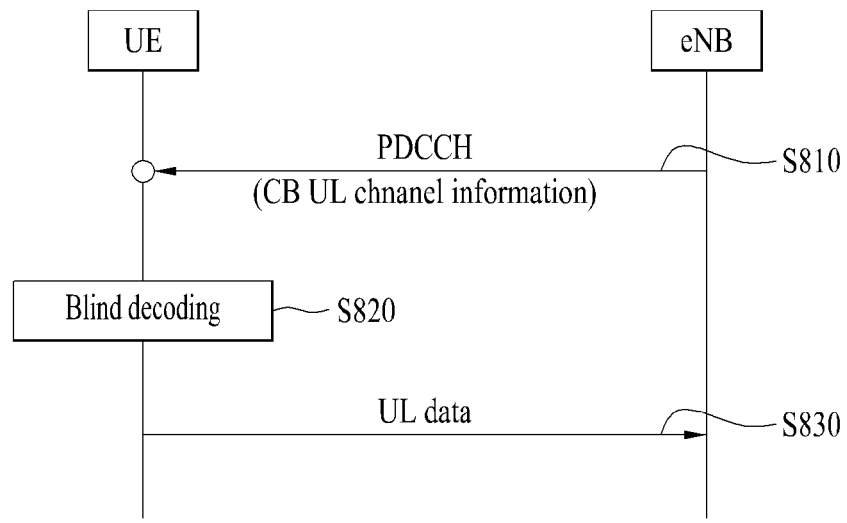
FIG. 8 illustrates one of methods for allocating a Contention-Based Uplink (CB UL) channel according to an embodiment of the present invention.

FIG. 8 illustrates one of methods for allocating a CB UL channel according to an embodiment of the present invention.

An eNB may allocate a CB UL channel persistently and periodically. That is, the CB UL channel may be scheduled persistently at a specific time in specific frequency resources. Thus, the eNB may transmit a PDCCH signal (i.e. DCI) scrambled with a CB-RNTI to one or more UEs (S810).

As described above in the embodiments of the present invention, each UE may receive the PDCCH signal by blind decoding of a common search space, a UE-specific search space, and/or a CB-specific search space (S820).

If the PDCCH signal includes resource allocation information about the CB UL channel (e.g. DCI or a CB grant), the UE may transmit UL data to the eNB without an SR in a period indicated by the resource allocation information (S830).

Since the CB UL channel is persistently allocated, the UE may transmit UL data to the eNB in the corresponding period without receiving additional resource allocation information about the CB UL channel.

Figure 9:
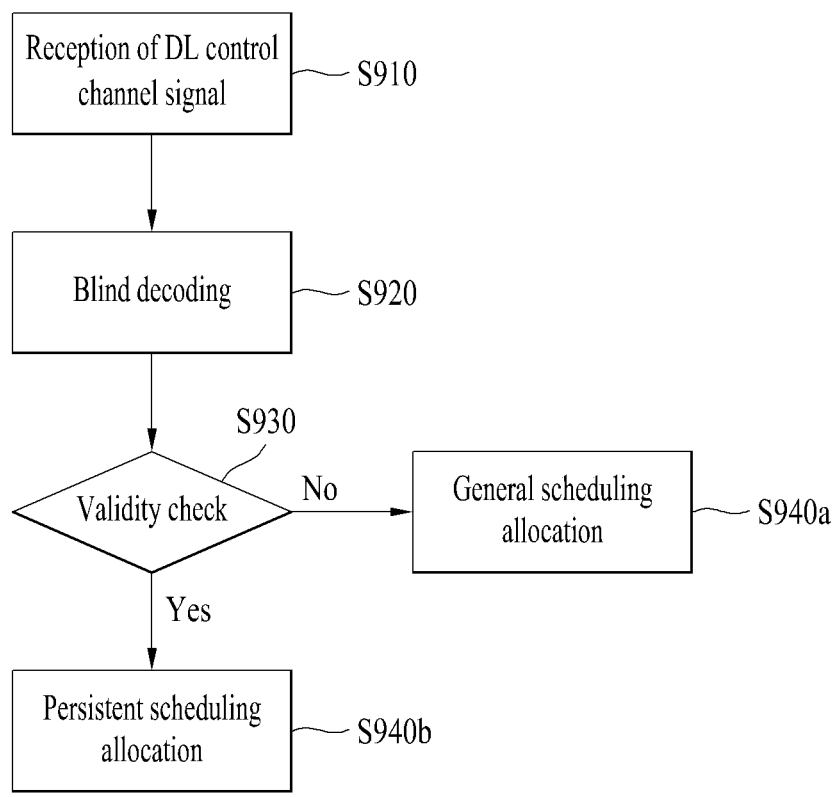
FIG. 9 illustrates another method for allocating a CB UL channel according to the embodiment of the present invention.

FIG. 9 illustrates another method for allocating a CB UL channel according to the embodiment of the present invention.

In FIG. 9, an ID used to allocate a CB UL channel (e.g. a CB-RNTI) may always indicate scheduling of a CB UL channel within a subframe. In addition, only when validity is ensured by a validity check operation, the CB UL channel may be persistently allocated.

Referring to FIG. 9, a UE may receive a DL control channel signal (e.g. a PDCCH) including resource allocation information about a CB UL channel (e.g. DCI or a CB grant) (S910).

As described above in the embodiments of the present invention, the UE may receive the DL control channel signal by blind decoding of a common search space, a UE-specific search space, and/or a CB-specific search space (S920).

The UE may check the validity of the received DL control channel signal. Specifically, it is determined whether one or more preset conditions are satisfied. The validity check conditions may include the type of an RNTI used for CRC scrambling, the type of a DCI format, and/or a bit value in a specific field (S930).

If the DL control channel signal is not valid in the validity check operation in step S930, the UE may determine that a CB UL channel has been allocated individually in each subframe (S940a). If the DL control channel is valid, the UE may determine that the CB UL channel has been persistently allocated in every predetermined period (S940b).

That is, in case of general scheduling allocation that does not satisfy validity, the UE may receive resource allocation information about a CB UL channel in each subframe by blind decoding and transmit UL data to the eNB according to the resource allocation information. On the other hand, in case of persistent scheduling allocation, the UE may transmit UL data to the eNB in a predetermined period without additionally receiving resource allocation information about the CB UL channel.

The UE may activate or release persistent scheduling of a CB UL channel by validity check.

Figure 10:
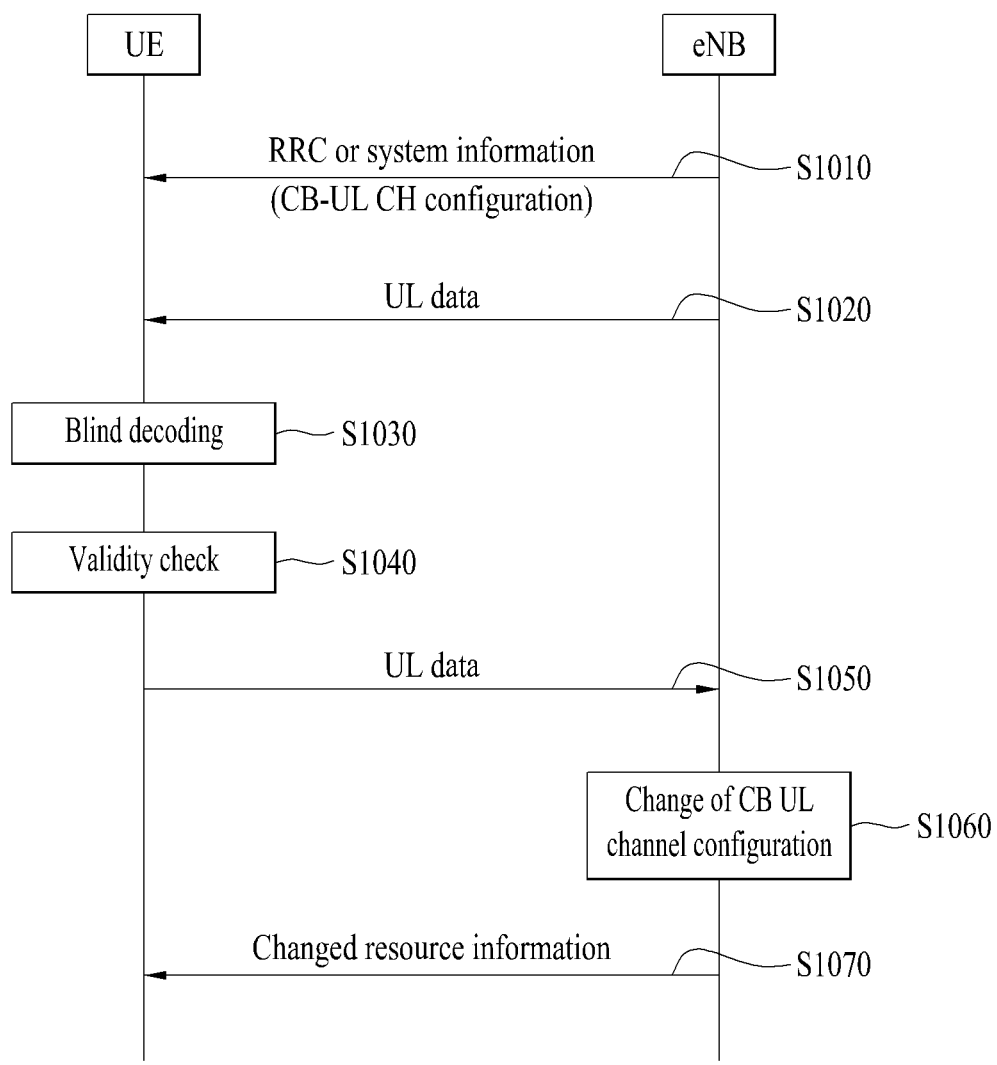
FIG. 10 illustrates a further method for allocating a CB UL channel according to the embodiment of the present invention.

FIG. 10 illustrates a further method for allocating a CB UL channel according to the embodiment of the present invention.

Although configuration information about a CB UL channel may be transmitted and received dynamically on a PDCCH (refer to FIG. 8), it may be transmitted and received by higher-layer signaling like RRC signaling or in broadcast information like system information.

Referring to FIG. 10, an eNB may transmit configuration information about a CB UL channel to each UE by an RRC signal or system information (S1010).

The eNB may also transmit resource information related to the use time (or starting point), activation, deactivation, or release of the CB-UL channel to the UE (S1020).

As described above in the embodiments of the present invention, the UE may receive the PDCCH signal by blind decoding of a common search space, a UE-specific search space, and/or a CB-specific search space (S1030).

Additionally, the UE may check the validity of the received PDCCH signal, as described before with reference to FIG. 9 (S1040).

If the PDCCH signal is valid in the valid check operation, the CB UL channel is allocated persistently in a predetermined period. If the PDCCH signal is not valid, a CB UL channel is allocated individually in each subframe. Accordingly, the UE may transmit UL data to the eNB based on the UL resource allocation information according to whether the PDCCH signal is valid (S1050).

The eNB may need to change the configuration of the CB UL channel allocated to the UE according to a communication environmental change (S1060).

When the eNB reconfigures the CB UL channel, the eNB may transmit changed resource information (i.e. resource information about the changed CB UL channel) to the UE. The changed resource information may be transmitted by higher-layer signaling or a PDCCH signal (S1070).

Upon receipt of the changed resource information by higher-layer signaling in step S1070, the UE may apply the changed resource information immediately. Or the UE may acquire the changed resource information by higher-layer signaling and may apply the changed resource information after a control message identified as a PDCCH signal is transmitted as in steps S1010 and S1020.

CB UL channel resources at the same position may be used persistently in every subframe or in every predetermined period. All of available frequency resources may be used for CB UL channel access. In this case, both appropriate power control and UE multiplexing may be considered.

On the contrary, a CB UL channel may be allocated to different resources over time. Whenever resource information about a CB UL channel is changed, the eNB may control the resource information by a PDCCH signal or in a predetermined use pattern.

In FIGS. 8, 9 and 10, the valid duration of a CB UL channel available to one or more UEs may be activated and/or deactivated by signaling from the eNB to each UE (e.g. transmission and reception of a PDCCH signal). Or the CB UL channel may be activated only within a specific valid duration and upon expiration of the valid duration, the use of the CB UL channel may be restricted.

If the valid duration is controlled by RRC signaling or system information, the eNB may transmit the end time of the CB UL channel as an absolute value to each UE. Herein, the eNB may use a subframe, a frame, or a superframe as a basic unit.

If CB UL channel resources are defined as system information, the eNB may indicate only the end time of the CB UL channel resources to the UE, not indicating the starting time of the CB UL channel resources. This is because the eNB can perform scheduling, taking into account resources for a CB UL channel, while the UE is receiving resource information about the CB UL channel.

While persistent CB UL channel allocation has been described with reference to FIGS. 8, 9 and 10, a CB UL channel may be allocated by semi-persistent scheduling. For example, the CB UL channel may be scheduled semi-persistently only within a time period (e.g. a predetermined multiple of a frame or superframe). In this case, the eNB may also transmit information about the valid duration of the CB UL channel in step S810, S910, S1010, or S1020.

In this case, it is not necessary to signal release information. However, the release information may be signaled to release the resources within a predetermined or signaled time period.

6. CB UL Channel Allocation Method Using Double Channels

Because an eNB cannot predict when each UE needs an SR or a BR, it allocates a CB UL channel. However, allocation of resources to the CB UL channel and transmission and reception of resource information about the CB UL channel in each subframe may cause unnecessary DL control overhead.

Therefore, the overhead of the network may be reduced by periodically allocating CB UL channels in a longer period than a subframe (e.g. a frame or a superframe). DL scheduling information about a CB UL channel may be transmitted to each UE on a broadcast channel or a DL control channel.

Figure 11:
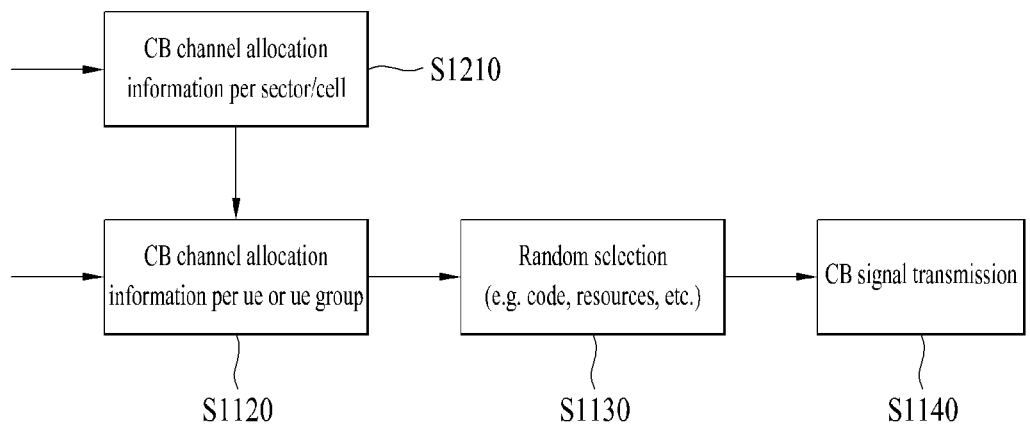
FIG. 11 illustrates one of methods for allocating a CB UL through double channels according to an embodiment of the present invention.

FIG. 11 illustrates one of methods for allocating a CB UL through double channels according to an embodiment of the present invention.

In FIG. 11, the eNB may transmit information about total available CB UL channels to UEs on a broadcast channel or by a broadcast message and may unicast to each UE information about a CB UL channel allocated specifically to the UE on a DL control channel or by a DL control message. That is, one or more CB UL channels may be allocated in a cell and a UE may use all CB UL channels or a specific CB UL channel.

Referring to FIG. 11, the eNB may transmit resource information (first CB channel information, CB-Info-A) about available CB UL channels of the eNB (or a cell or sector) to each UE (S1110).

If a CB UL channel is persistently allocated, the first CB channel information may include information about periodicity and information about resources allocated to the CB UL channel in step S1110.

Each UE may receive resource information about an additional CB UL channel ($2^{nd}$ CB channel information, CB-Info-B) by reception and demodulation of a DL control channel. That is, the UE may acquire information about CB UL channels available to the UE or a UE group based on the second CB channel information, from among CB UL channels acquired by the first CB channel information (S1120).

The UE may acquire the channels allocated to the UE or the UE group by random selection. Herein, the UE may select a CB UL channel based on a code or resources (S1130).

The UE may transmit UL data to the eNB on the CB UL channel available to the UE (S1140).

Figure 12:
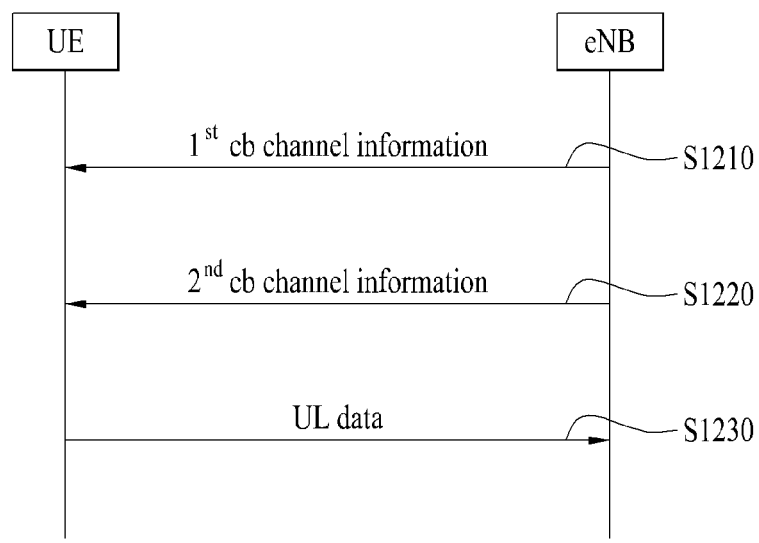
FIG. 12 illustrates another method for allocating a CB UL through double channels according to the embodiment of the present invention.

FIG. 12 illustrates another method for allocating a CB UL through double channels according to the embodiment of the present invention.

The eNB may allocate one or more CB UL channels in a cell or sector managed by the eNB. The eNB may broadcast allocation information about one or more allocated CB UL channels (first CB channel information) on a broadcast channel or by a broadcast message (S1210).

The broadcast channel or the broadcast message may be a Master Information Block (MIB) or a System Information Block (SIB) used in the LTE system in step S1210.

The eNB may allocate a CB UL channel on a UE basis or on a UE group basis. Preferably, the CB UL channel allocated on a UE basis or on a UE group basis is included in CB UL channels that the eNB can allocate. Thus, the eNB may transmit CB channel allocation information (i.e. second CB channel information) for each UE or each UE group to each UE (S1220).

In step S1220, the DL control channel may be a PDCCH in the LTE-A system and an A-MAP in an IEEE 802.16m system.

In FIG. 12, each UE may determine CB UL channels available in the eNB based on the first CB channel information and acquire a CB UL channel available to the UE based on the second CB channel information. Therefore, the UE may transmit UL data to the eNB on the available CB UL channel (S1230).

In FIG. 12, a CB UL channel may be allocated persistently as described before with reference to FIGS. 8, 9 and 10 and configuration information about the CB UL channel may be changed according to a channel environment. The second CB channel information may further include information about the use time (or starting point), activation, deactivation, or release of the CB-UL channel for each UE or each UE group.

7. CB UL Channel Allocation Method in Multi-Carrier Environment

A multi-carrier environment is considered as a communication environment in the embodiments of the present invention. That is, a multi-carrier system or a carrier aggregation system used in the present invention aggregates one or more carriers each having a narrower bandwidth than a target band to configure the target broad band.

According to the present invention, multicarrier refers to carrier aggregation (or carrier combination). Carrier aggregation covers both contiguous and non-contiguous carrier aggregations. The term carrier aggregation is interchangeably used with carrier combination or spectrum aggregation.

The LTE-A system aims to support up to 100 MHz by multiple carriers (i.e. carrier aggregation) configured by aggregating two or more CCs. In aggregating one or more carriers having a narrower bandwidth than a target band, the bandwidth of each of the carriers may be restricted to a bandwidth used in the legacy system in order to ensure backward compatibility with the legacy IMT system.

For example, the 3GPP LTE system (the LTE Rel-8 system) may support bandwidths of 1, 4, 3, 5, 10, 15, and 20 MHz and the 3GPP LTE advanced (i.e. LTE-A) system may support a broader bandwidth than 20 MHz using the bandwidths supported by the LTE system. Or a multicarrier system according to the present invention may support carrier aggregation by defining a new bandwidth irrespective of the bandwidths used in the legacy system.

The LTE-A system adopts the concept of cell to manage radio resources. A cell is defined as a combination of DL resources and UL resources and the UL resources may be selectively defined. For example, one cell may be composed of UL resources only or both DL and UL resources. When multiple carriers (carrier aggregation) are supported, the linkage between the carrier frequencies (or DL CCs) of DL resources in a cell and the carrier frequencies (or UL CCs) of UL resources in the cell may be indicated by system information.

That is, a single cell is composed of one or more DL CCs and may selectively include one or more UL CCs. In the LTE-A system, the concept of cell covers a Primary Cell (PCell) and a Secondary Cell (SCell). The PCell operates in a primary frequency (e.g. a primary CC) and the SCell operates in a secondary frequency (e.g. a secondary CC). Only one PCell and one or more SCells may be allocated to a specific UE.

The PCell is used for a UE to perform an initial connection establishment procedure or a connection reestablishment procedure. The PCell may be a cell indicated during handover. The Scell may be configured after an RRC connection is established and used for providing additional radio resources.

The PCell and SCell may be used as serving cells. Only one serving cell including only a PCell exists for a UE for which carrier aggregation is not set in spite of RRC_CONNECTED state or for a UE that does not support carrier aggregation. In contrast, one or more serving cells may exist for an RRC_CONNECTED UE for which carrier aggregation has been configured. The entire serving cells include a PCell and one or more SCells.

After an initial security activation operation is started, the E-UTRAN may configure a network including one or more SCells in addition to an initially configured PCell during a connection establishment procedure. Each of the PCell and SCell may operate as a CC in the multicarrier environment. That is, carrier aggregation may be considered to be a combination of a PCell and one or more SCells.

In the embodiments of the present invention, a Primary CC (PCC) may be used in the same meaning as a PCell and a Secondary CC (SCC) may be used in the same meaning as a SCell. If the concept of cell is introduced, a DL CC may be composed of one serving cell in the embodiments of the present invention.

The embodiments of the present invention described before with reference to FIGS. 5 to 12 may be applied to the multicarrier system (i.e. the carrier aggregation system). Thus the followings should be considered in applying the embodiments of the present invention to the multicarrier system.

(1) A CB UL channel may be limited to one of serving cells. For example, a serving cell to which a CB UL channel can be allocated may be limited to an available PCell (i.e. a PCC). When the CB UL channel is allocated to the PCell, a UE may easily acquire resource information about the CB UL channel and the eNB may control the CB UL channel more efficiently.

On the other hand, a CB UL channel may be allocated to a specific SCell (i.e. an SCC) other than a PCell. If a CB UL channel may be allocated to a specific SCell other than a PCell, the PCell does not suffer from contention-incurring inefficiency.

(2) Each UE may receive scheduling information for a CB UL channel (e.g. DCI or a CB grant) through a PCell. The scheduling information may be transmitted in a common search space, a UE-specific search space, or a CB-specific search space. Therefore, the UE may perform blind decoding in the corresponding search space.

(3) If a CB UL channel is not linked to a serving cell that transmits scheduling information about the CB UL channel, a UE should receive information about the serving cell to which the CB UL channel is allocated (e.g. a carrier indictor).

Accordingly, the carrier indicator may be transmitted to each UE by higher-layer signaling or in the scheduling information for the CB UL channel (e.g. in a Carrier Indicator Field (CFI)).

(4) Preferably, a UE does not transmit a CB UL channel signal and a PUSCH or PUCCH signal simultaneously. For example, if the UE is to simultaneously transmit a CB UL channel and UL data on a PUSCH or PUCCH in the same subframe, the UE does not preferably transmit UL data on the CB UL channel. However, in the case where a higher layer configures a UE to simultaneously transmit a PUSCH signal and a PUCCH signal, the UE may transmit UL data on the PUSCH and PUCCH in the same subframe.

If a UE transmits one or more UL data in the same subframe according to a communication environment, the UE may transmit a CB UL channel signal with priority over other PUSCH or PUCCH signal to the eNB.

Figure 13:
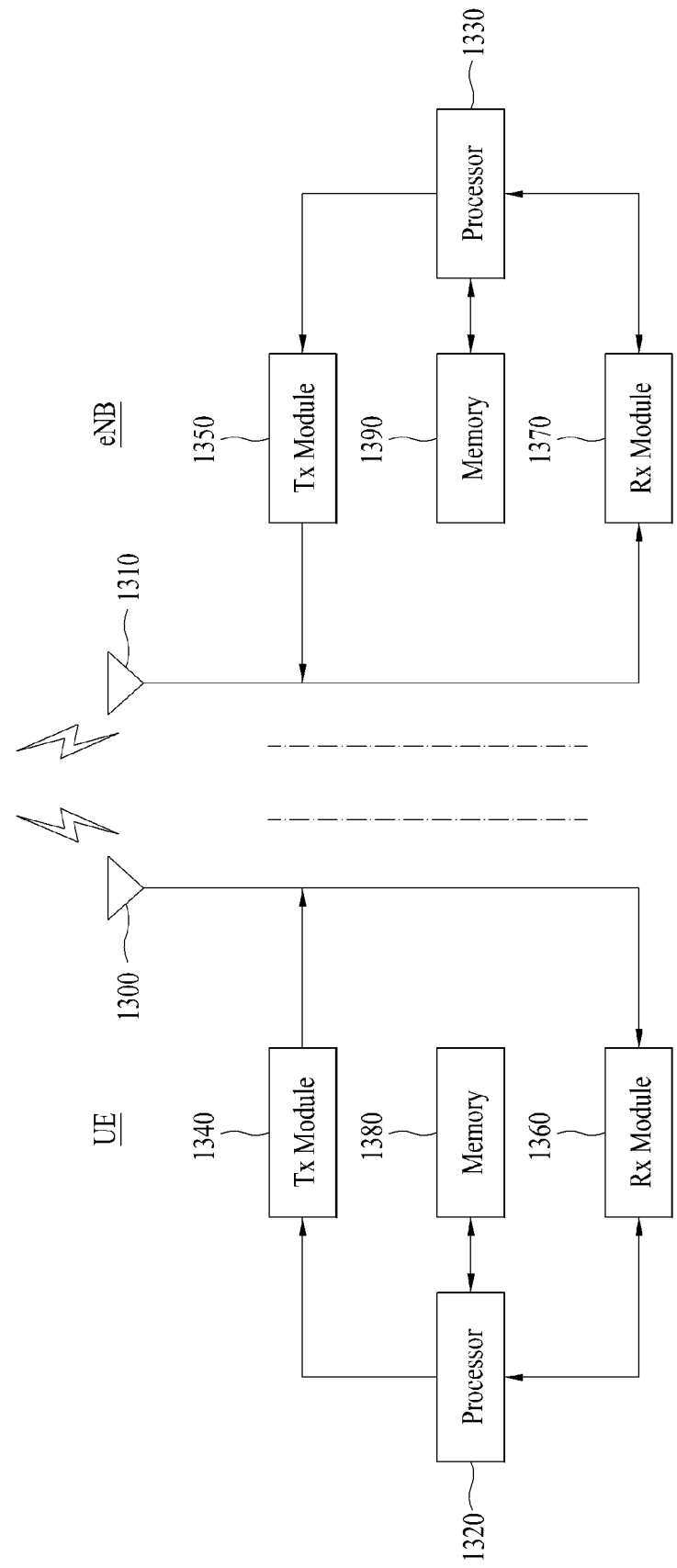
FIG. 13 illustrates an exemplary apparatus for supporting the methods for allocating a CB UL channel according to an embodiment of the present invention.

FIG. 13 illustrates an exemplary apparatus for supporting the methods for allocating a CB UL channel according to an embodiment of the present invention.

A UE may operate as a transmitter on uplink and as a receiver on downlink. An eNB may operate as a receiver on uplink and as a transmitter on downlink.

That is, the UE and the eNB may include Tx modules 1340 and 1350 and Rx modules 1350 and 1370 for controlling transmission and reception of information, data, and/or messages and antennas 1300 and 1310 for transmitting and receiving information, data, and/or messages. The UE and the eNB may include processors 1320 and 1330 for implementing the foregoing embodiments of the present invention and memories 1380 and 1390 for temporarily or persistently storing data during processing at the processors 1320 and 1330.

Particularly, the processors 1320 and 1330 of the UE and the eNB may support the CB UL channel signal transmission method, the CB UL channel resource allocation method considering the number of blind decodings, the persistent CB UL channel allocation method, the CB UL channel allocation method using double channels, and/or the CB UL channel allocation method in a multicarrier environment (refer to FIGS. 5 to 12) according to the embodiments of the present invention.

For example, the processor of the UE may monitor and blind-decodes at least one of a common search space, a UE-specific search space, and/or a CB-specific search space in order to receive a PDCCH signal (DCI) including resource information and/or scheduling information regarding a CB UL channel. The processor of the eNB may allocate a CB UL channel to a UE or a UE group and may provide each UE with allocation information about the CB UL channel by controlling the Tx module.

The Tx modules and Rx modules of the UE and the eNB may perform a packet modulation/demodulation function for data transmission, a fast packet channel coding function, an OFDMA packet scheduling function, a Time Division Duplex (TDD) packet scheduling function, and/or a channelization function. In addition, the UE and the eNB illustrated in FIG. 12 may further include low-power Radio Frequency (RF)/Intermediate Frequency (IF) modules.

The apparatus illustrated in FIG. 13 are means for implementing the embodiments of the present invention described before with reference to FIGS. 5 to 12. The embodiments of the present invention can be performed using the components and functions of the above-described UE and eNB.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a MultiMode-MultiBand (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MB terminal refers to a terminal which has a multi-modem chip built therein and which can operate in any of a mobile Internet system and other mobile communication systems (e.g. CDMA 2000, WCDMA, etc.)

Embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in the memory units 1380 and 1390 and executed by the processors 1320 and 1330. The memory units are located at the interior or exterior of the processors and may transmit and receive data to and from the processors via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to various wireless access systems. For example, the various wireless access systems include a 3GPP LTE, 3GPP LTE-A, 3GPP2, and/or IEEE 802.16xx system. The embodiments of the present invention are also applicable to any technological field having applications of the various wireless communication systems.

The invention claimed is:

1. A method for transmitting an uplink signal on a Contention-Based Uplink (CB UL) channel, the method comprising:
  receiving configuration information about the CB UL channel from a base station;
  receiving resource information about the CB UL channel from the base station, the resource information including information about at least one of a use time, activation, deactivation, and release of the CB UL channel; and
  checking the validity of the resource information,
  wherein if the resource information is not valid, the resource information is allocated individually in each subframe and if the resource information is valid, the resource information is allocated periodically and persistently.

2. The method according to claim 1, wherein the configuration information is received by a higher-layer signal and the resource information is received on a Physical Downlink Control CHannel (PDCCH).

3. The method according to claim 1, further comprising blind-decoding a search space to receive the resource information,
wherein the search space is one of a UE-specific search space, a UE group-specific search space, and a CB-specific search space.

4. The method according to claim 1, wherein the resource information is included in a CB grant.

5. A method for transmitting an uplink signal on a Contention-Based Uplink (CB UL) channel, the method comprising:
receiving from a base station first CB channel information about all CB UL channels available in the base station;
receiving from the base station second CB channel information about a CB UL channel available to a user equipment; and
transmitting the uplink signal based on the first CB channel information and the second CB channel information to the base station.

6. The method according to claim 5, wherein the first CB channel information is received in a system information message and the second CB channel information is received on a Physical Downlink Control CHannel (PDCCH).

7. The method according to claim 5, wherein the CB UL channel available to the user equipment is allocated periodically and persistently.

8. The method according to claim 7, further comprising checking the validity of the second CB channel information,
wherein if the second CB channel information is not valid, the resource information is allocated individually in each subframe and if the second CB channel information is valid, the resource information is allocated periodically and persistently.

9. The method according to claim 5, further comprising blind-decoding a search space to receive the second CB channel information,
wherein the search space is one of a UE-specific search space, a UE group-specific search space, and a CB-specific search space.

10. A user equipment for transmitting an uplink signal on a Contention-Based Uplink (CB UL) channel, the user equipment comprising:
a reception module for receiving a channel signal;
a transmission module for transmitting a channel signal; and
a processor for supporting transmission of the uplink signal on the CB UL channel,
wherein the user equipment receives configuration information about the CB UL channel from a base station through the reception module, receives resource information about the CB UL channel from the base station, the resource information including information about at least one of a use time, activation, deactivation, and release of the CB UL channel through the reception module, and checks the validity of the resource information through the processor,
wherein if the resource information is not valid, the resource information is allocated individually in each subframe and if the resource information is valid, the resource information is allocated periodically and persistently.

11. The user equipment according to claim 10, wherein the configuration information is received by a higher-layer signal and the resource information is received on a Physical Downlink Control CHannel (PDCCH).

12. The user equipment according to claim 10, wherein the user equipment blind-decodes a search space to receive the resource information, and
wherein the search space is one of a UE-specific search space, a UE group-specific search space, and a CB-specific search space.

13. The user equipment according to claim 10, wherein the resource information is included in a CB grant.

14. A user equipment for transmitting an uplink signal on a Contention-Based Uplink (CB UL) channel, the user equipment comprising:
a reception module for receiving a channel signal;
a transmission module for transmitting a channel signal; and
a processor for supporting transmission of the uplink signal on the CB UL channel,
wherein the user equipment receives from a base station first CB channel information about all CB UL channels available in the base station through the reception module, receives from the base station second CB channel information about a CB UL channel available to the user equipment through the reception module, and transmits the uplink signal based on the first CB channel information and the second CB channel information to the base station through the transmission module.

15. The user equipment according to claim 14, wherein the first CB channel information is received in a system information message and the second CB channel information is received on a Physical Downlink Control CHannel (PDCCH).

16. The user equipment according to claim 14, wherein the CB UL channel available to the UE is allocated periodically and persistently.

17. The user equipment according to claim 16, wherein the user equipment checks the validity of the second CB channel information through the processor, and
wherein if the second CB channel information is not valid, the resource information is allocated individually in each subframe and if the second CB channel information is valid, the resource information is allocated periodically and persistently.

18. The user equipment according to claim 14, wherein the user equipment blind-decodes a search space to receive the second CB channel information through the processor, and
wherein the search space is one of a UE-specific search space, a UE group-specific search space, and a CB-specific search space.

* * * * *